June 2, 1959  M. M. HANN  2,888,810
HYDRAULIC CONTROL SYSTEM FOR A REFRIGERATION DRIVE
Filed Sept. 19, 1955  5 Sheets-Sheet 1
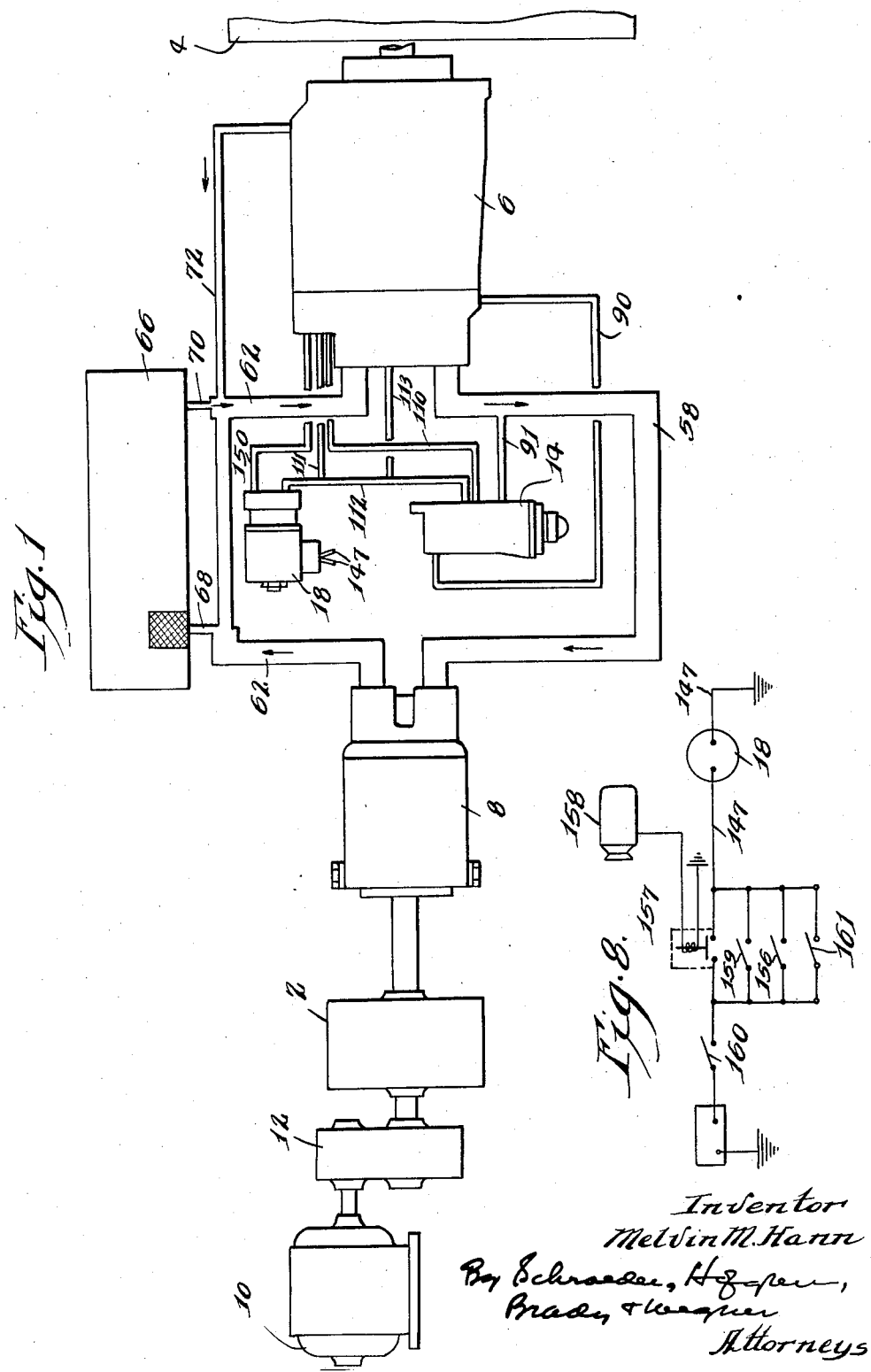

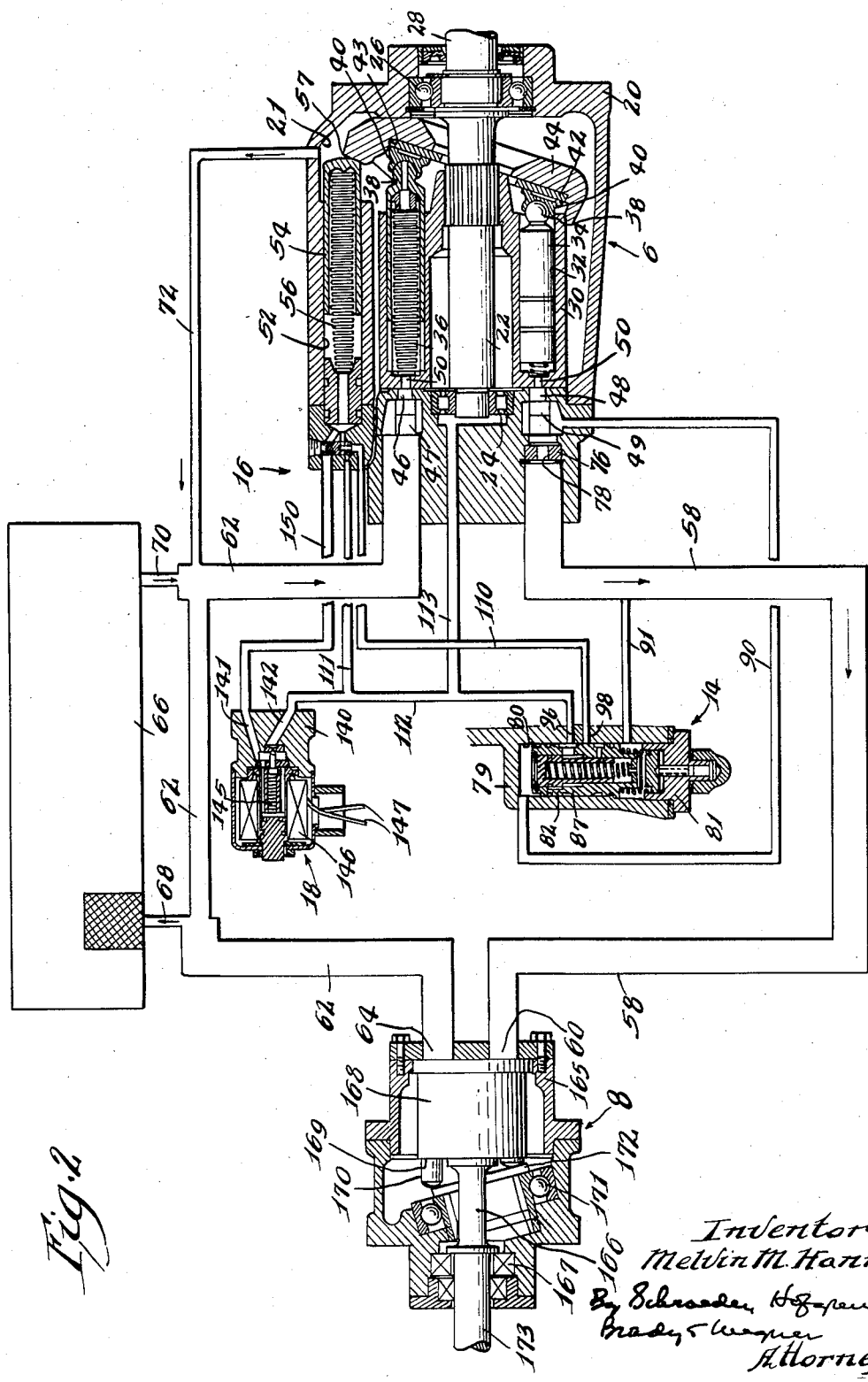

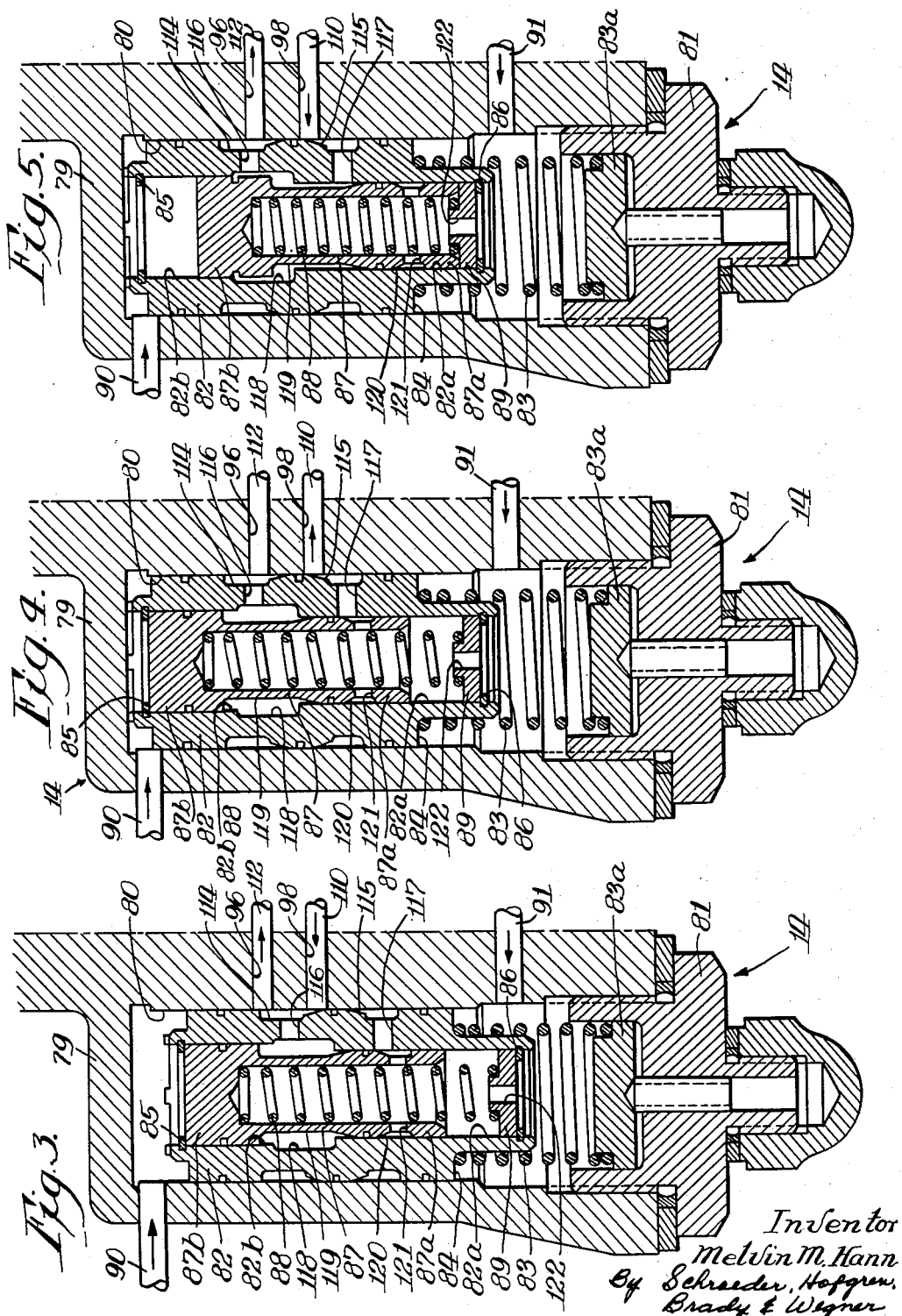

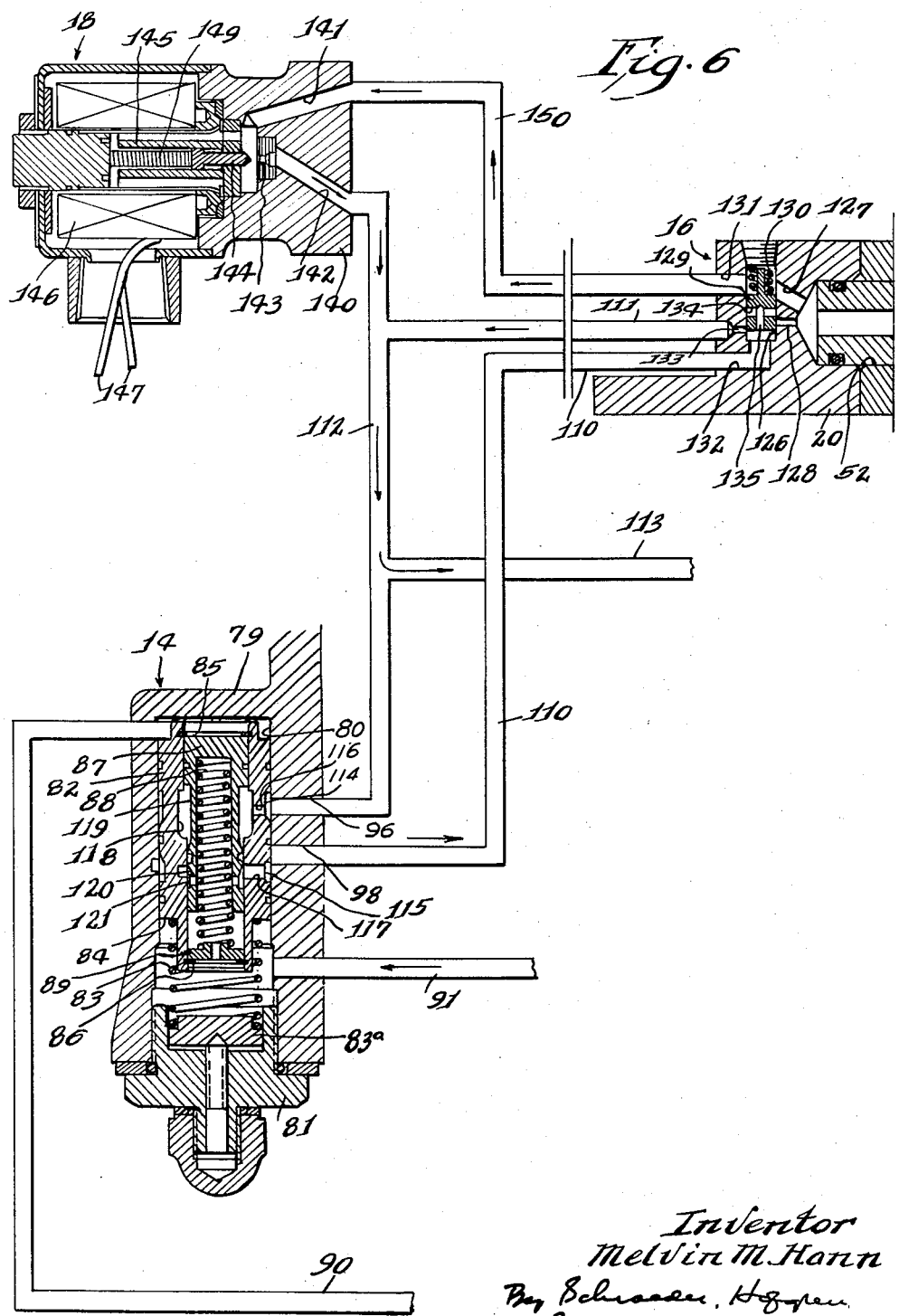

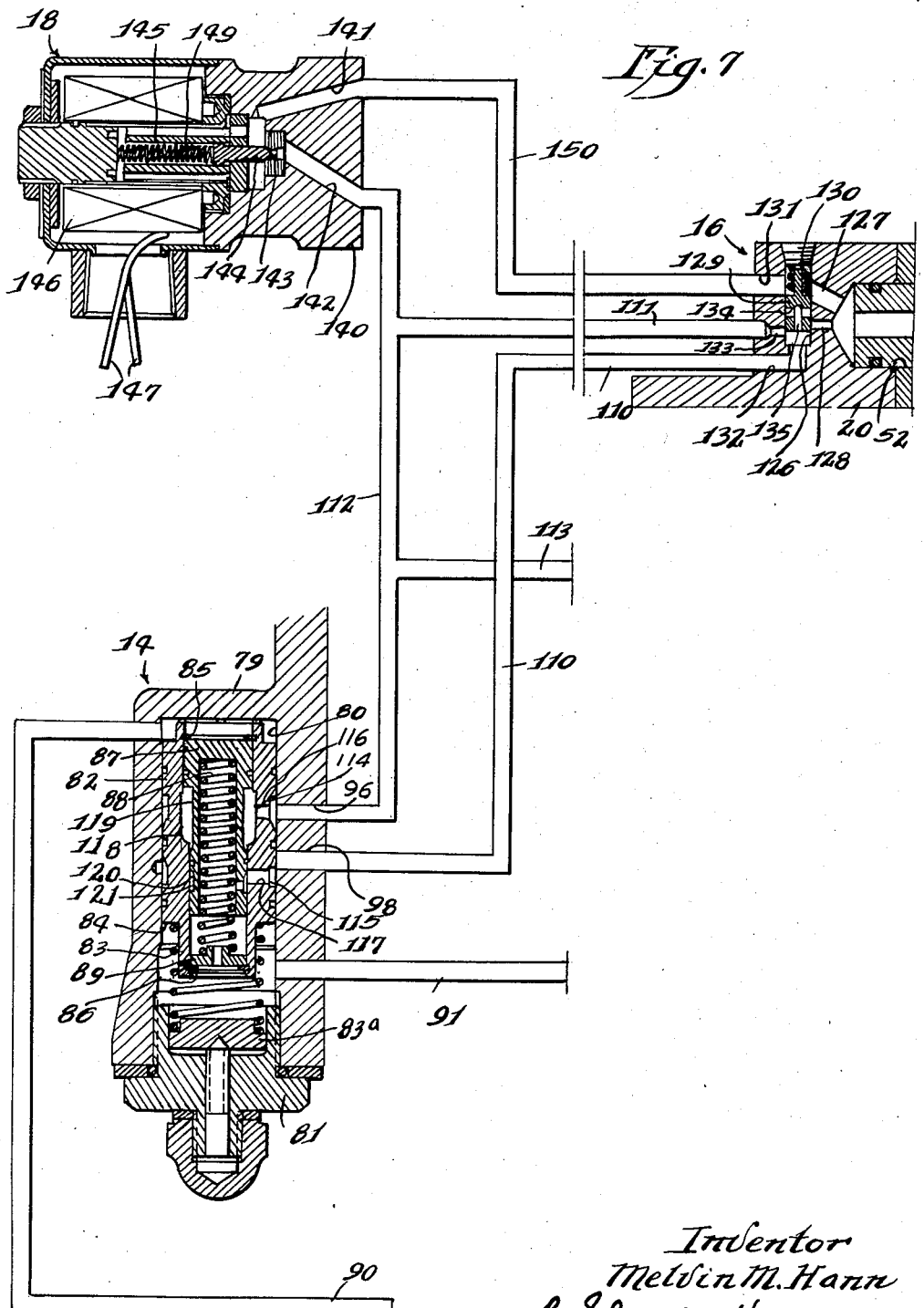

United States Patent Office 2,888,810
Patented June 2, 1959

2,888,810

HYDRAULIC CONTROL SYSTEM FOR A REFRIGERATION DRIVE

Melvin M. Hann, Rockford, Ill., assignor to Sundstrand Machine Tool Co., a corporation of Illinois Application September 19, 1955, Serial No. 535,146

22 Claims. (Cl. 62—215)

This invention relates to a hydraulic and electrical control, and more particularly to a control system for a refrigeration drive.

A general object of this invention is to provide a new and improved hydraulic and electrical control system.

An object of this invention is to provide a new and improved drive for a refrigeration unit which may be powered by a remote source.

Another object of this invention is to provide a new and improved hydraulic and electrical control system for a refrigeration unit installed in a motor vehicle and driven by power derived from the power plant of the vehicle, being especially well adapted for such a unit installed in a detachable trailer section of such a motor vehicle.

Another object of this invention is to provide a new and improved control system for a refrigeration drive wherein the refrigeration unit is disposed in a detachable trailer section and is adapted to be driven from the prime mover of the tractor during operation thereof and by an electric motor at other times.

Another object of this invention is to provide a new and improved hydraulic and electrical control system for a refrigeration drive wherein a compressor is driven from a constant displacement hydraulic motor which is connected by fluid conduits to a variable displacement hydraulic pump driven from a variable speed source.

Another object is to provide a new and improved hydraulic and electrical control system for a refrigeration drive of the character described including a hydraulic control valve responsive to output flow from the pump to vary the displacement of the pump, an acceleration valve to prevent sudden increases in displacement, and a solenoid valve operable to feather the pump when actuated by suitably provided controls.

Other objects and advantages will become apparent from the following detailed description taken in connection with the accompanying drawings, in which:

Fig. 1 is a schematic diagram of an embodiment of the invention;

Fig. 2 is a diagrammatic view of a portion of Fig. 1 with the pump, motor, control valve, acceleration valve, and solenoid valve shown in vertical section;

Fig. 3 is a vertical sectional view of the control valve showing the control valve sleeve in a position to reduce the pump displacement and the over-pressure relief valve in an inoperative position;

Fig. 4 is a view similar to Fig. 3 showing the control valve sleeve in a position to increase the pump displacement and the over-pressure relief valve in an inoperative position;

Fig. 5 is a view similar to Fig. 3 showing the control valve sleeve and the over-pressure relief valve in a position wherein the relief valve is effective to reduce the pump displacement;

Fig. 6 is a vertical sectional view showing the control valve in the position of Fig. 4, the acceleration valve in an acceleration control position, and the solenoid valve in open position;

Fig. 7 is a view similar to Fig. 6 showing the solenoid valve in closed position; and Fig. 8 is a diagrammatic view showing the various switch means for actuating the solenoid valve to feather the pump.

While the invention herein described is a preferred embodiment, it is not intended to limit the invention to the specific form and arrangements shown, it being contemplated that various changes may be made by those skilled in the art without departing from the spirit and scope of the appended claims.

Referring now to Fig. 1, there is shown a compressor 2 adapted to be located in a detachable trailer and driven normally from the remote tractor engine 4 through a hydraulic transmission including a variable displacement hydraulic pump 6 and a constant displacement hydraulic motor 8. An electric motor 10 is connected through a suitable speed reducer 12 to drive the compressor 2 on standby when the trailer is detached or the tractor engine 4 is not running.

Referring now to Fig. 2, the control means for the pump 6 includes a control valve 14, an acceleration valve 16 and a solenoid valve 18 which will be described in detail subsequently.

Pump

The hydraulic pump 6 includes a casing 20 defining a swash plate chamber 21 with a drive shaft 22 being journalled in the casing 20 in bearings 24 and 26. One end 28 of the drive shaft 22 is adapted to be operably connected to the truck engine 4. Splined to the shaft 22 for rotation therewith is a barrel 30 having formed therein a series of circumferentially arranged, parallel cylinders 32. Slidably movable in the cylinders 32 are a series of hollow pistons 34 which are urged toward the swash plate end of the cylinders 32 by internal springs 36. The outwardly extending ends of the pistons 34 are spherical or ball-shaped as indicated at 38 and adapted to form ball and socket connections with slippers 40 which bear against the face of a swash plate 42. The swash plate face 42 is made of a hardened bearing material and seats in a recess 43 in a nonrotatable swash plate or cam plate 44 so as to be permissibly rotatable therein with respect to the swash plate. The swash plate 44 is mounted in the casing 20 so as to surround the shaft 22 and is adapted to be tilted to vary the stroke of the pistons 34 and thus the displacement of the pump 6.

The pump 6 has an intake kidney 46 communicating with an inlet port 47 and a discharge kidney 48 communicating with an outlet port 49 and the cylinders 32 are each provided with cylinder ports 50 extending from the discharge end of each cylinder 32 so as to communicate alternately with the intake kidney 46 and the discharge kidney 48 upon rotation of the barrel 30.

It is thus believed apparent that upon rotation of the barrel 30 by the shaft 22, as one of the cylinders 32 is moved so that its cylinder port 50 is placed in communication with the intake kidney 46, the piston moves outwardly so as to draw hydraulic fluid into the cylinder. As the barrel 30 continues to rotate, the cylinder port 50 is moved to a position communicating with the discharge kidney 48 at which time the piston is moved on its discharge stroke by the swash plate 44, forcing the hydraulic fluid therein into the discharge kidney 48 and outlet port 49.

Means are provided in the casing 20 for varying the angle of tilt of the swash plate 44 to vary the displacement of the pump 6, including a control cylinder 52 formed in the casing 20 having a hollow control piston 54 movable therein. An internal spring 56 acts to urge the control piston 54 outwardly so that the end of the control piston 54 bears against a shoulder portion 57 of the swash plate 44. The swash plate is mounted off center to create a moment tending to bias it toward a vertical or neutral stroke position, overcoming the force of the spring 56. When at rest the relative strength of the springs 56 and 36 is such as to leave the swash plate in a stroking position, i.e. tilted about 2° from vertical.

A fluid conduit 58 is connected between the outlet port 49 of the pump 6 and an inlet port 60 of the hydraulic motor 8 with a fluid conduit 62 being connected between an outlet port 64 of the hydraulic motor 8 and the pump inlet port 47. A hydraulic fluid reservoir 66 is connected to the fluid conduit 62 by means of conduits 68 and 70, with a conduit 72 being connected between the fluid conduit 62 and the chamber 21 in the casing 20 within which the swash plate is disposed.

The control valve 14 is sensitive to discharge flow from the pump 6 and is provided with means for controlling the swash plate angle through the medium of the control piston 54. For sensing flow from the pump 6, an orifice block 76 having an orifice 78 is positioned in the conduit 58 adjacent the pump outlet 49 and means later to be described are provided for transmitting to the control valve 14 the differential pressures existing on opposite sides of the orifice.

Control valve

Referring now to Fig. 3, the control valve 14 is mounted in an end cap 79 of the pump housing, said cap having a cylindrical bore 80 formed therein which is closed at one end by a plug 81. A control sleeve 82 having a bore 82a is slidable in the bore 80 and is urged in one direction therein by a spring 83 disposed between a shoulder 84 formed on the sleeve 82 and a spring seat 83a adjustably mounted in one end of the bore 80. An upper portion 82b of the sleeve bore 82a is stepped so as to have a larger diameter than the portion of the bore therebeneath. Snap rings 85 and 86 are disposed adjacent each end of the bore of the sleeve. A hollow over-pressure relief valve 87 is slidably mounted in the hollow of the sleeve 82 and has a major portion 87a slidable in the bore 82a and an upper flanged portion 87b slidable in the bore 82b. The relief valve 87 is closed at its upper end and is normally urged upwardly against the snap ring 85, so as to effectively close one end of the sleeve 82, by a spring 88 which has one end bearing against a cylindrical disc 89 seated on the snap ring 86 and the other end bearing against the closed end of the relief valve 87.

The upper end of the bore 80 of the control valve 14 is connected to the high pressure side of the orifice 78 by a conduit 90 (Figs. 2 and 3) and the lower end of the bore 80 is connected to the conduit 58 on the low pressure side of the orifice 78 by a conduit 91 so that the control sleeve 82 is positioned in the bore 80 by the pressure differential existing on opposite sides of the orifice 78 resulting from the discharge flow from the pump 6.

The control valve casing 79 includes passages 96 and 98 which are adapted to communicate with various grooves and ports formed in the sleeve 82 and the relief valve 87 in different positions of the sleeve 82 and the relief valve 87. The passage 98 communicates with the control cylinder 52 through a conduit 110 (Figs. 2 and 3) while the passage 96 communicates with the pump case through conduits 112 and 113. The passage 96 also communicates with the control cylinder 52 through conduits 112 and 111.

Referring now to Figs. 3, 4 and 5 for a more detailed description of the arrangement of grooves and ports disposed in the control valve sleeve 82 and the relief valve 87, it will be seen that a pair of spaced annular grooves 114 and 115 are formed in the outer surface of the sleeve 82 and are adapted to communicate, in different positions of the sleeve 82, with the passages 96 and 98 formed in the valve casing 79. Extending radially through the sleeve 82 from the grooves 114 and 115, respectively, are ports 116 and 117. An annular groove 118 is formed on the inner surface of the sleeve 82 and communicates with the outer groove 114 through port 116. The relief valve member 87 has an elongated reduced portion 119 formed in the outer periphery thereof which is at all times in communication with the port 116 and the groove 118 in the sleeve 82, and adapted to communicate with the port 117. An annular groove 120 is formed in the outer periphery of the relief valve 87 spaced from the groove 119 and having a series of ports 121 extending therefrom through the relief valve 87 whose hollow interior is in communication with the low pressure side of the orifice 78 through the fluid conduit 91, the bore 80 and an opening 122 in the disc 89.

As to the general operation of the hydraulic circuit thus far described, as the variable displacement pump 6 must provide a substantially constant input to the constant displacement motor 8 so that the compressor 2 will be driven at a constant speed, the control valve 14 which is responsive to the output flow from the pump 6 is provided to vary the position of the swash plate 44 through the control piston 54 to increase the displacement of the pump 6 when the speed of the pump drive from the truck engine 4 decreases and to decrease the displacement of the pump 6 when the speed of the truck engine 4 increases.

Before the truck engine 4 is started to drive the pump 6, the control valve sleeve 82 is positioned in the upper portion of the bore 80 by the spring 83, and the valve member 87 is positioned in the upper part of sleeve 82, against ring 85, by spring 88, as illustrated in Fig. 4. When the barrel 30 starts rotating, fluid will be pumped through the outlet kidney 48. As the initial pressure in the high pressure conduit 90 will not be sufficient to overcome the force of the spring 83, the valve sleeve 82 will remain in its upper position (Fig. 4), and valve member 87 will remain in its upper position; so that the low pressure conduit 91 communicates with the conduit 110 through the port 122, ports 121, the groove 120, the ports 117, the groove 115 and the passage 98. Thus, discharge fluid flows from the conduit 58, through the control valve 14, and through the conduit 110 to the control cylinder 52 and shifts the control piston 54 against the swash plate 44 to increase the angle thereof and, thus, increase the displacement of the pump 6. As pump flow increases, the pressure differential on opposite sides of the orifice 78 also increases and as the pressure in the high pressure conduit 90 builds up, the control sleeve 82 is shifted downwardly, the ring 85 in sleeve 82 moving the valve member 87 with the sleeve 82, until the system pressure on the low pressure side of the orifice 78 plus the pressure of the spring 83 is equal to the pressure on the high pressure side of the orifice 78. At this point (see Fig. 2), the displacement of the pump 6 is proper for the operation of the constant displacement hydraulic motor 8. With the movement of the control sleeve 82 halted at such neutral point, the groove 115 is no longer in communication with the passage 98 and further pressure fluid flow to the control cylinder 52 is blocked off. This condition exists until the speed of the truck engine 4 either increases or decreases causing the pump 6 to operate faster or slower.

If the speed of the pump 6 increases, the pump output starts to increase which increases the pressure differential across the orifice 78 causing the control sleeve 82 to be shifted downwardly to the position of Fig. 3, putting the groove 114 into communication with both of the passages 96 and 98. When this occurs, fluid in the control cylinder 52 is drained therefrom through the conduit 110, the passage 98, the groove 114, the passage 96, the conduits 112 and 113 to the pump case. This drainage of fluid from the control cylinder 52 permits the pressure moment to move the swash plate 44 toward a lower stroke position and, thus, decreases the stroke of the pump pistons 34. When the stroke of the pistons 34 has been decreased enough to compensate for the increased drive speed, the control sleeve 82 is shifted upwardly to the neutral position blocking further drainage of fluid from the control cylinder 52.

If the speed of the pump 6 decreases, the pump output flow also decreases, reducing the pressure differential across the orifice 78 and permitting the control sleeve 82 to be moved upwardly by the spring 83 from the neutral position until the groove 115 communicates with the passage 98, as illustrated in Fig. 4. This directs pressure fluid from the low pressure conduit 91 through the port 122, the ports 121, the groove 120, the ports 117, the groove 115, the passage 98, and the conduit 110 into the control cylinder 52 and forces the control piston 54 outwardly to increase the angle of the swash plate 44 and increases the stroke of the pistons 34, thereby maintaining constant output flow from the pump 6 to the hydraulic motor 8.

Over-pressure relief valve

The previously described over-pressure relief valve 87 is provided to reduce the displacement of the pump 6 and, thus, the pressure in the system when the pressure in the system rises to a predetermined relatively high value such as would occur if a driven element became locked or an obstruction occurred in a discharge line. When the hydraulic system is operating below a predetermined pressure value which would be the upper limit for safe and efficient operation, the over-pressure relief valve 87 is inoperative and is seated against the snap ring 85 by the spring 88, as shown in Figs. 2, 3 and 4. But if the pressure of the system exceeds a predetermined value, the over-pressure relief valve 87 becomes operable, as shown in Fig. 5.

In Fig. 4, as the system pressure exceeds the predetermined value, it is communicated to the upper portion of the bore 80 through the high pressure conduit 90. The over-pressure relief valve 87 is a stepped valve, having an upper end 87b of greater cross-sectional area than the lower end of the valve. The fluid pressure on the differential area of the relief valve 87, when the pressure exceeds the predetermined maximum, is sufficient to overcome the force of the spring 88 and start shifting the relief valve 87 downwardly in the control sleeve 82 to block communication between the groove 120 and the ports 117 and cut off control fluid from the conduit 110 and the control cylinder 52. The relief valve 87 continues to move downwardly in the control sleeve 82 until the position of Fig. 5 is reached where the elongated groove 119 on the relief valve 87 communicates with the ports 116 and 117 which are in communication, respectively, with the passages 96 and 98 through the grooves 114 and 115. This allows fluid to flow out of the control cylinder 52 through the conduit 110, the groove 115, the ports 117, the elongated groove 119, the ports 116, the groove 114, the conduits 112 and 113 to the pump case 21, allowing the control piston 54 to feather the pump 6 to a stroke position determined by the load of the spring 88 and reduce the pressure of the system below the predetermined value.

Acceleration valve

In order to prevent rapid increases in the angle of tilt of the swash plate 44 and, thus, sudden increases in load or pressure surges which would normally occur with sudden surges of control fluid to the control piston 54, the acceleration valve 16 is provided.

The acceleration valve 16 is disposed adjacent the inlet to the control cylinder 52 and includes a cylindrical bore 126 (see Figs. 6 and 7) formed in the end cap 79. Two spaced passages 127 and 128 extend from the bore 126 into the control cylinder 52 and a valve member 129 is slidably mounted in the bore 126 and urged downwardly by a spring 130. A passage 131 communicates with the upper end of the bore 126, a passage 132 communicates with the lower end of the bore 126 and a bypass orifice 133 is located between the passages 131 and 132 and communicates with the bore 126. The passage 132 is connected by the fluid conduit 110 to the passage 98 in the control valve 14, and the bypass 133 is connected to the chamber 21 in the pump casing 20 by the conduits 111, 112 and 113.

The acceleration valve member 129 has a lateral passage 134 extending therethrough adapted to communicate with the passage 128 in normal operation, during which operation the valve 129 blocks the bypass orifice 133, as illustrated in Fig. 2. Another passage 135 extends lengthwise of the valve member 129 from the lateral passage 134 and opens to the bottom surface of the valve member 129.

It will be clear that the acceleration valve just described performs a number of useful functions in the operation of the control. On start-up of the truck engine, the control valve 14 would be calling for maximum displacement of the pump and directing fluid under pressure into the conduit 110, as illustrated in Figs. 4 and 6. Inasmuch as no fluid under pressure is in the passage 31 and conduit 150 (Fig. 6), the acceleration valve member 129 is moved upwardly to the position of Fig. 6 and the principal part of the control fluid is directed to tank through the conduit 111. Leakage around the valve member 129 permits control fluid to flow into the cylinder 52 and slowly move the control piston 54 to the right, increasing pump displacement. When movement of the control piston 54 stops, pressure then builds up in the control cylinder 52, and thus in the conduit 150. When this occurs, the portion of the acceleration valve 129 exposed to the pressures in the latter conduit is subjected to a force equal to that applied by the fluid in the conduit 110 with the opposed portion of the valve exposed therein, and thus the spring 130 may move the acceleration valve downwardly closing off the conduit 111 and providing direct communication between the fluid in the conduit 110 and the interior of the control cylinder 52 through the passages 135 and 134. Again, if the engine of the truck is already running but idling roughly, when the engine slows down during the rough portion of the idle the pump also slows down and the control valve calls for a sudden increase in pump displacement to continue the pump output at its predetermined level. Such a sudden increase in pump displacement at the low point of the engine rpm would have a tendency to stall the engine, but again a surge of control pressure to the acceleration valve serves to move it upwardly, thereby tanking the major portion of control pressure directed to the control cylinder.

It can be seen, therefore, that the acceleration valve provides for a gradual increase in the displacement of the pump rather than a sudden increase. As the compressor load on acceleration is very heavy, the acceleration valve has the effect of causing the acceleration of the motor (and hence the compressor) over an extended period, rather than suddenly, and thus no heavy load on belt drives, gears, etc. for the pump is created.

Solenoid valve

In order to feather the pump 6 to zero stroke and stop the hydraulic motor 8 automatically under certain conditions, the solenoid valve 18 is provided. The normally closed solenoid valve 18 is adapted when energized to relieve the pressure in the control cylinder 52 and, thus, allow the swash plate 44 to assume its zero-stroke position.

The solenoid valve 18 comprises a casing 140 (Figs. 6 and 7) having an inlet passage 141 and an outlet passage 142 which communicate with each other through an orifice 143. A plunger 144 is carried by a solenoid core 145 positioned in a coil 146 having leads 147, the plunger 144, being spring-urged by a spring 149 to close the orifice 143 when the solenoid coil 146 is not energized, during normal refrigerating operation of this system, as illustrated in Fig. 7. The inlet passage 141 is connected to the passage 131 of the acceleration valve 16 by a fluid conduit 150 and the outlet passage 142 is connected to the chamber 21 of the pump casing 20 by the conduits 112 and 113 so that when the solenoid coil 146 is energized, the orifice 143 is opened (as illustrated in Fig. 6) allowing fluid to be drained from the control cylinder 52 through the solenoid valve 18 to the pump casing chamber 21, thus feathering the pump 6.

In the embodiment of the invention illustrated, in which the pump 6 is driven directly from the engine 4 of the tractor section of a truck and the refrigeration compartment is located on the trailer section, control means have been provided to automatically shut down the hydraulic motor 8 and, thus, the compressor 2 when the truck engine is operating below a predetermined idling speed, when the door to the refrigeration compartment is opened, or when the temperature in the refrigeration compartment reaches a predetermined temperature so that no further refrigeration is required. As suitable fans and blowers (not shown) may be located in the refrigeration compartment and operably connected to be driven by the hydraulic motor 8, it is advisable to have the hydraulic motor 8 and blowers automatically shut down when the door to the refrigeration compartment is opened so that the cold air is not forced out of the compartment into the atmosphere. When the truck engine is turning over at very low speeds, the pump would have to be operating at maximum displacement, and hence at maximum torque, in order to produce proper operation of the motor and compressor. This is an undesirable situation, even apart from the excessive wear on the pump drive belts, etc., and for this reason means are provided for automatically feathering the pump when the engine speed is too slow.

Referring now to Fig. 8, the circuit for the solenoid valve 18 includes a normally open thermostat switch 156 disposed in the refrigeration compartment and adapted to close when the temperature in the compartment reaches a predetermined value at which no further refrigeration is required. A normally open switch 157 is located in the tractor engine generator circuit which includes a generator 158. The switch 157 is adapted to close whenever the generator voltage decreases below its maximum voltage which occurs whenever the tractor engine 4 is operating below the predetermined idling speed. A normally open switch 159 is adapted to be closed when the door to the refrigeration compartment is opened. As shown in Fig. 8, the switches 156, 157 and 159 are connected in parallel to the leads 147 of the solenoid coil 146 so that closing of any one of the switches energizes the solenoid valve 18 feathering the pump 6 and shutting down the hydraulic motor 8. Connected in series with the solenoid valve 18 and the parallel network of switches 156, 157 and 159 is an ignition switch 160.

Where a hydraulic system of the present type is operated from the portion of the drive shaft of the truck located between the transmission and the clutch thereof (as contrasted to a belt drive from the truck engine), it has been found that difficulty is experienced in shifting gears of the truck, as the hydraulic drive tends to slow down the driven gears so that the synchronizer in the truck transmission is unable to correlate or match the speeds of the drive and driven gears of the transmission. With the present system, however, it is possible to add a third switch 161 which is closed each time the clutch pedal of the truck is depressed, thereby unloading the pump and eliminating the load on the shaft operated by the driven gears of the truck transmission.

It is believed obvious that the solenoid circuit could be reversed so that the solenoid valve 18 is closed during normal refrigeration operation by having the solenoid coil 146 energized, in which case the switches 156, 157, 159 and 161 would be normally closed and connected in series so that opening of any one of the switches would de-energize the solenoid coil 146 and unload the pump 6.

When the coil 146 is energized, the plunger 144 is withdrawn from the orifice 143 to the position shown in Fig. 6 allowing control fluid in the control cylinder 52 to flow therefrom through the passage 127, the upper portion of the bore 126, the passage 131, the conduit 150, the passage 141, the orifice 143, the passage 142, and the conduits 112 and 113 to the pump chamber 21, thus allowing the swash plate 44 to assume a substantially feathered position. As the output flow from the pump 6 through the orifice 78 is thus reduced, the control sleeve 82 is shifted upwardly to increasing stroke position, putting the groove 115 into communication with the passage 98 so that discharge fluid flows from the low pressure conduit 91 to the acceleration valve 16 through the conduit 110, as illustrated in Figs. 4 and 6. With the control fluid from the control cylinder 52 being drained through the upper portion of the bore 126 and the flow of the discharge fluid into the lower portion of the bore 126 from the conduit 110, the action of the spring 130 is overcome causing the acceleration valve member 129 to move upwardly in the bore 126, thus, closing the passage 128 to the control cylinder 52. Thus only the leakage of the discharge fluid past the valve member 129 into the control cylinder 52 is drained through the solenoid valve 18. Since it is possible that the pump may be operated for an indefinite period of time in this position very little leakage fluid would be directed into the pump chamber 21 to remove the heat generated by the churning of the fluid by the rotating parts. To prevent overheating of the pump 6 and possible failure thereof, the upward movement of the acceleration valve member 129 closing the passage 128 opens the bypass orifice 133, allowing a substantial portion of the discharge fluid to flow from the conduit 110 through the lower portion of the bore 126, the bypass orifice 133, and the conduits 111, 112 and 113 to the pump chamber 21, thereby providing cooling of the pump 6.

It will also be noted that the solenoid valve is not required to handle all of the fluid directed into the conduit 110 by the control valve but, on the contrary, need only reduce the pressure in the cylinder 52 and passage 150 to permit the swash plate to shift toward zero stroke and to cause the acceleration valve to move upwardly. Thus, the solenoid valve may be smaller in size than would otherwise be required.

Fig. 7 shows the positions of the control members at the instant the solenoid valve 18 is de-energized causing the plunger 144 to close the orifice 143. The control sleeve 82 is in its upper open position permitting system pressure to be conveyed to the acceleration valve 16 from the low pressure conduit 91 through the ports 121, the groove 120, the ports 117, the groove 115, the passage 98 and the conduit 110. The acceleration valve member 129, however, is still in its upper position closing the passage 128 to the control cylinder 52 so that only the leakage fluid enters the control cylinder 52. But with the solenoid valve 18 closed, the pressure in the control cylinder 52 cannot be relieved and, consequently, a gradual increase of pressure will be obtained in the control cylinder 52, causing the control piston 54 to gradually increase the angle of the swash plate 44 and, thus, slowly accelerate the hydraulic motor 8. When the control piston reaches the end of its travel, the pressure in the control cylinder will build up to equal control input pressure and the acceleration valve member 129 will be shifted downwardly to the open position allowing direct communication between the passages 132 and 128 through the acceleration valve passages 135 and 134, as illustrated in Fig. 2.

*Hydraulic motor*

As seen in Fig. 2, the constant displacement hydraulic motor 8 includes a casing 165 having a rotable shaft 166 journalled therein in suitable bearings, such as a typical bearing arrangement 167. Secured to the shaft 166 is a barrel type housing 168 having arranged circumferentially and axially therein an annular row of cylinders 169 each having a piston 170 slidably mounted therein. A bearing 171 is secured within the casing 165 at a predetermined angle surrounding the shaft 166 and carrying a swash plate 172, the pistons 170 being adapted to bear against the swash plate 172. As fluid is pumped from the hydraulic pump 6 through the conduit 58 into the inlet port 60 of the motor 8, the fluid is forced into cylinders 169 of the barrel housing 168 which are in communication with the input port 60 forcing the pistons 170 against the angularly tilted swash plate 172, thus, causing rotation of the barrel housing 168 and the shaft 166. An end portion 173 of the shaft 166 is adapted to be connected to the shaft of the compressor 2 of the refrigeration unit and, if desirable, through suitable drive means to blowers or fans (not shown) disposed in the refrigeration compartment. As the barrel housing 168 rotates, the pistons 170 are forced inwardly in their cylinders 169 by the fixed angle swash plate 172 forcing the fluid out of the cylinders 169 and the outlet port 64, with which the cylinders 169 come into communication, and into the fluid conduit 62.

An additional feature of the hydraulic motor 8 lies in the fact that when there is no drive for the hydraulic pump 6 and the compressor 2 is driven by the electric motor 10, the hydraulic motor 8 will not operate as a hydraulic pump, thus, eliminating the need for any clutch means between the motor 8 and the compressor 2. When the compressor 2 is driven by the electric motor 10, the shaft 166 and the barrel housing 168 of the hydraulic motor 8 are also driven. But with this construction, after one full revolution of the barrel housing 168, all of the pistons 170 are forced inwardly in their cylinders 169 by the angled swash plate 172 where they are held by the centrifugal force of rotation of the barrel housing 168. This centrifugal force is sufficient to overcome the pressure head of the fluid in the reservoir 66 which would tend to hold the pistons against the swash plate 172, causing the motor 8 to act as a pump when it is driven by the electric motor 10. In cases where the reservoir is at a relatively high elevation, a check valve may be provided in the motor outlet line 62.

I claim:

1. A hydraulic control system for providing a constant input to a hydraulic motor from a variable speed swash plate type hydraulic pump comprising, in combination; an orifice in the outlet of the pump, a slidably mounted control valve having opposite ends thereof connected by fluid conduits to opposite sides of the orifice, the pressure differential across the orifice acting to move said control valve, a hydraulic piston and cylinder device operable to vary the angle of the swash plate, conduit means connected between said control valve and said hydraulic piston and cylinder device to position the piston therein in response to movement of said control valve, and an acceleration valve connected between said control valve and said hydraulic piston and cylinder device adapted to prevent sudden surges of fluid pressure to said piston and cylinder device on rapid movement of said flow control valve, said acceleration valve comprising, means defining a bore intersecting said conduit means between the control valve and the piston and cylinder device, a valve member slidable in the bore and having fluid passages therein and resilient means urging the valve to a position wherein the valve passages allow communication between the control valve and the piston and cylinder device, sudden surges of fluid from the control valve acting to shift the valve member so that only leakage fluid around the valve member enters the piston and cylinder device.

2. In a refrigeration system wherein a compressor is to be driven at a constant speed from a remote variable speed drive through a hydraulic transmission including a variable displacement pump and a constant displacement motor, a hydraulic control system comprising, in combination; an orifice positioned in the pump outlet, a flow control valve connected across the orifice and shiftable by the pressure differential thereacross, fluid actuated means movable to control the output of the pump, conduit means connected between said control valve and said fluid actuated means to move said fluid actuated means in response to movement of said control valve, a normally closed solenoid valve controlling said conduit means and adapted to open when energized to divert fluid from the fluid actuating means, and means for energizing said solenoid valve.

3. A hydraulic control system for a refrigeration drive comprising, in combination; a constant displacement hydraulic motor for driving a compressor, a hydraulic pump having its output connected by a fluid conduit to said motor, said pump being driven from a variable speed source, fluid actuated means for controlling the displacement of the pump, fluid passage means between the conduit connecting the pump and the motor and the fluid actuated means, a control valve controlling said fluid passage means and responsive to the output flow of the pump to control the flow of fluid to said fluid actuated means for maintaining a constant pump output, and a relief valve connected in said fluid passage means and responsive to the fluid pressure in the system at a predetermined value to divert fluid from said fluid actuated means to reduce the output of the pump to zero.

4. In a refrigeration unit for a vehicle having a drive motor, in combination; a compressor, a hydraulic motor having an output shaft connected to drive the compressor while the vehicle is in operation, a hydraulic pump driven from the vehicle motor and having an orifice in its outlet, a hydraulic control system including a control valve responsive to fluid flow through the orifice connected between said hydraulic pump and said hydraulic motor and adapted to provide a constant fluid input to said hydraulic motor, an electric motor connected to drive the compressor on standby when the truck is not in operation, said hydraulic motor comprising a tilted swash plate, a horizontal rotatable barrel on said output shaft having a series of axial cylinders formed therein in an annular row, pistons reciprocable in said cylinders and adapted to bear at one end against said tilted swash plate, said pistons being movable inwardly in said cylinders by the swash plate after one revolution of the barrel due to rotation of said output shaft when the compressor is being driven by the electric motor and being retained in said cylinders by friction caused by the centrifugal force of rotation of the barrel so that the motor pistons do not stroke.

5. In a refrigeration system, in combination; an axial piston rotatable barrel type hydraulic pump having a tiltable swash plate adapted to vary the stroke of the pistons, the barrel being rotated by a variable speed prime mover, a control piston slidable in a cylinder formed in the pump casing to vary the angular placement of the swash plate, means forming an orifice disposed in the outlet of the pump, a control valve comprising, a casing having ports, a hollow valve member having a closed end slidable in the casing and urged in one direction by a spring, said valve member having external annular grooves adapted to communicate with the ports in the casing, ports extending inwardly through the valve member from the grooves, first conduit means connecting opposite ends of the valve casing across the orifice in the pump outlet so that the valve member is positioned in the casing by the pressure differential across the orifice, second conduit means connected between the valve casing ports and the swash plate control piston to vary the position of the piston and, thus, the displacement of the pump to maintain a constant pump output with variations in the prime mover speed, and an acceleration valve positioned in the inlet to the control piston and adapted to be shifted by a sudden surge of fluid from the control valve to substantially restrict the flow of fluid to the control piston and, thus, prevent sudden increases in the angle of the swash plate.

6. A hydraulic control system for a refrigeration drive comprising, in combination; a variable displacement hydraulic pump having a casing, and means for maintaining a constant pump output with a variable speed pump drive comprising, means forming an orifice in the pump outlet, a control valve including a valve casing, a sleeve closed at one end and slidable in the valve casing so that ports in the sleeve open and close passages in the valve casing, conduit means connecting opposite ends of the valve casing respectively to the pump outlet on opposite sides of the orifice to deliver pressure fluid acting against opposite ends of the sleeve so that the sleeve is positioned in the valve casing in response to the pressure differential across the orifice, fluid actuated means in the pump casing for varying the pump output, fluid passage means connecting the valve casing passages and the fluid actuated means, said control sleeve being positioned to admit fluid to the fluid actuated means to increase the pump output when the pump drive speed decreases and to drain fluid from the fluid actuated means to decrease the pump output when the pump drive speed increases, an over-pressure relief valve having ports slidably positioned in the control sleeve and adapted to be shifted to divert fluid from the fluid actuated means to decrease the pump output when the pressure in the system increases to a predetermined value and an acceleration valve member positioned in said fluid passage means adjacent said fluid actuated means allowing normal fluid flow between the control valve and the fluid actuated means during gradual increases in fluid flow but adapted to be shifted to restrict the passage of fluid thereby by sudden surges of fluid resulting from rapid movement of the control sleeve so that the pump output is not increased too rapidly, an exhaust passage connecting the fluid actuated means to drain, a normally closed solenoid valve in the exhaust passage adapted when energized to open the exhaust passage for draining fluid from the fluid actuated means so as to decrease the pump output to zero, and switch means operable to energize the solenoid valve when the pump drive speed is below a predetermined value.

7. A hydraulic control system comprising, in combination; a variable displacement hydraulic pump, a cylinder and piston device for controlling the displacement of the pump, a source of control fluid under pressure, a control valve movable to control flow of the control fluid to and from said device in response to a change in the discharge flow of the pump to maintain a constant pump output, conduit means for connecting said source to said cylinder and piston device, an acceleration valve disposed in said conduit means between the control valve and the cylinder and piston device comprising, a valve member slidable in a bore, a spring urging the valve member in one direction, a series of passages formed in the valve member and adapted in one position of the valve member to provide communication between the cylinder and piston device and the control valve, said valve member being shifted to a second position by a surge of fluid in said conduit means to restrict communication between the control valve and the cylinder and piston means, said acceleration valve acting to even out any sudden pressure surges from the control valve to the cylinder and piston means.

8. A refrigeration drive and control for a tractor-trailer vehicle wherein the trailer section has a refrigeration compartment comprising, in combination; a compressor for the refrigeration compartment, a constant displacement hydraulic motor on the trailer section operably connected to drive the compressor, a variable displacement hydraulic pump on the tractor section and operably connected to be driven by the tractor motor, fluid conduit means between the tractor section and the trailer section for delivering the pump output to the hydraulic motor, a control piston and cylinder device for varying the displacement of the pump, means for maintaining a constant fluid input to the motor including, conduit means connecting the pump outlet and the control piston and cylinder device, means defining an orifice in the pump outlet, a control valve located in said conduit means for controlling flow therethrough and having portions exposed to the pressure differential existing across the orifice, said valve being movable to control said flow in response to said pressure differential, an over-pressure relief valve slidably mounted in the control valve and responsive to a predetermined pump discharge pressure to be shifted in the control valve to control flow in said conduit means to drain said control cylinder and thereby decrease the pump output so as to maintain the fluid pressure in the system below a predetermined value, an acceleration valve positioned in the conduit means between the control piston and cylinder device and the control valve and responsive to sudden surges of pressure from rapid movement of the control valve to be shifted to restrict the flow of fluid to the control piston and prevent sudden increases in the pump output, a normally closed solenoid valve on the tractor section connected by a conduit to the control piston and cylinder device and adapted when energized to drain fluid from the control piston and cylinder device to unload the pump and stop the hydraulic motor, a switch in the tractor motor generator circuit operable to close when the speed of the tractor motor is less than idling speed, a switch adapted to be closed when a door of the refrigeration compartment is opened, a thermostat switch adapted to close when sufficient refrigeration has been obtained, and an electrical circuit between the tractor and trailer sections connecting said three switches to the solenoid in a parallel arrangement so that closing of any of the switches energizes the solenoid, thus, opening the solenoid valve, unloading the pump and stopping the hydraulic motor.

9. A hydraulic and electrical control system for a refrigeration drive wherein a constant displacement fluid motor is connected to drive a compressor and a variable displacement fluid pump driven from a variable speed source has its output connected through fluid conduits to the fluid motor comprising, in combination; an orifice block forming an orifice in the pump outlet, a cylinder and piston device for varying the displacement of the pump, means connected across the orifice and to the cylinder and piston device to operate said device in response to pressure differential across said orifice, means responsive to the temperature of a refrigerated compartment, a first switch actuated by said means, means responsive to the speed of the pump drive, a second switch actuated by said means, means responsive to the opening and closing of the door to the refrigerated compartment, a third switch actuated by said means, and a normally closed solenoid valve connected to said cylinder and piston device and energizable by actuation of any of said three switches to unload the pump and stop the hydraulic motor.

10. In a hydraulic control system for controlling the displacement of a variable displacement fluid pump; control fluid pressure operated means for varying the displacement of the pump, a fluid supply passage for directing control fluid under pressure to said fluid operated means, a bypass passage, a valve controlling the fluid supply passage, means defining a leakage path around said valve, said valve being movable in response to a substantial pressure differential in the supply passage and in the pressure operated means to direct control fluid into the bypass with said leakage path permitting restricted flow of control fluid to said pressure operated means to build up control fluid pressure therein, and means urging said valve toward a position to reestablish communication between the supply passage and the pressure operated means as the pressures therein approach equality.

11. In a hydraulic control system for controlling the displacement of a variable displacement hydraulic pump;

means forming an orifice in the pump outlet, fluid actuated means for varying the pump output, control valve means connected across the orifice and shiftable in response to output flow from the pump, fluid passage means for directing control fluid from the control valve means to the fluid actuated means, a fluid bypass passage intersecting the fluid passage means, a valve member slidably mounted in the fluid passage means adjacent the bypass passage for controlling the passage of fluid to the fluid actuated means, and resilient means normally urging the valve member to a position providing communication between the control valve means and the fluid actuated means and blocking the bypass passage, said valve member being movable in response to a surge of fluid from the control valve to divert a substantial portion of the control fluid to the bypass passage and restrict the flow of control fluid to the fluid actuated means to leakage fluid past the valve member to prevent rapid movement of the fluid actuated means.

12. A hydraulic control system for controlling the displacement of a fluid pump having an inlet and an outlet comprising; fluid operated means for varying the displacement of the pump, a valve movable to control the supply of fluid to said fluid operated means, means forming an orifice on the outlet side of the pump, means operative in response to the pressure differential on opposite sides of the orifice to move the valve, a normally closed solenoid valve operable when energized to evacuate fluid from the fluid operated means to reduce the pump displacement to zero, and switch means adapted when actuated to energize the solenoid valve.

13. In a hydraulic control system for controlling the displacement of a variable displacement fluid pump; control fluid pressure operated means for varying the displacement of the pump, a fluid supply passage for directing control fluid under pressure to said fluid operated means, a bypass passage, a valve controlling the fluid supply passage, means defining a leakage path around said valve, said valve being movable in response to a substantial pressure differential in the supply passage and in the pressure operated means to direct control fluid into the bypass with said leakage path permitting restricted flow of control fluid to said pressure operated means to build up control fluid pressure therein, means urging said valve toward a position to reestablish communication between the supply passage and the pressure operated means as the pressures therein approach equality, a fluid discharge passage for evacuating fluid from said fluid pressure operated means to reduce the pump displacement to zero, a normally closed valve in said fluid discharge passage, and means for selectively opening said normally closed valve.

14. A control for a variable displacement pump comprising a hydraulic device for varying the displacement of the pump, a source of fluid under pressure, a conduit connecting the source to said device, a first and a second drain passage connected to said device, a valve member having a portion in the conduit and exposed to the fluid pressure therein and having an opposed portion in the first drain passage and exposed to the fluid pressure therein, said valve member being movable in response to a decrease in the pressure in said first drain passage from a normal position interconnecting the conduit and the device to a second position interconnecting the conduit and the second drain passage, and means for decreasing the pressure in said first drain passage.

15. A control for a variable displacement pump comprising a hydraulic piston and cylinder device for varying the displacement of the pump, a source of fluid under pressure, a conduit connecting the source to said device, a first and a second drain passage connected to said device, a valve member having a portion in the conduit and exposed to the pressure therein and having an opposed portion in the first drain passage and exposed to the fluid pressure therein, said valve member being movable in response to a decrease in the pressure in said first drain passage from a normal position blocking the second drain passage and interconnecting the conduit and the device to a second position connecting the conduit with said second drain passage, means urging the valve member toward said normal position, a solenoid valve controlling the first drain passage, and means for operating the solenoid to control the pressure in said first drain passage.

16. In a refrigeration system for a motor vehicle including a variable displacement pump driven by the engine of the vehicle and a hydraulic motor driven by the pump and operating the refrigeration compressor, control means comprising a hydraulic piston and cylinder device for varying the displacement of the pump, a source of fluid under pressure, a conduit connecting the source to said device, a first and a second drain passage connected to said device, a valve member having a portion in the conduit and exposed to the pressure therein and having an opposed portion in the first drain passage and exposed to the fluid pressure therein, said valve member being movable in response to a decrease in the pressure in said first drain passage from a normal position blocking the second drain passage and interconnecting the conduit and the device to a second position connecting the conduit with said second drain passage, means urging the valve member toward said normal position, a solenoid valve controlling the first drain passage, and a switch operated each time the clutch of the engine is disengaged and connected to operate the solenoid to drop the pressure in said first drain passage.

17. In a refrigeration system for a motor vehicle including a variable displacement pump driven by the engine of the vehicle and a hydraulic motor driven by the pump, said engine having a drive including a clutch, control means comprising means responsive to the pump output for varying the displacement of the pump to deliver a substantially constant flow, and means operated concurrently with disengagement of the clutch of the engine transmission to cause said displacement varying means to reduce the displacement of the pump to shift gears.

18. A hydraulic control system for controlling the displacement of a fluid pump having a variable speed drive means, an inlet, a discharge line, and a fluid operated device for controlling displacement of the pump, a restriction in the discharge line, a control valve for controlling flow of fluid to the fluid operated device, a pair of conduits connected respectively to said discharge line on opposite sides of said restriction and to said valve to apply the pressure on either side of the restriction to opposite ends of the valve to control the position of the valve, a line connected with the control valve and with the fluid operated device, and porting in said valve controlled by the valve position for connecting one of said conduits to said last recited line for delivery of fluid to said device to increase pump displacement on decrease of pump output flow through the restriction.

19. A hydraulic control system for controlling the displacement of a fluid pump having a variable speed drive means, an inlet, a discharge line, and a fluid operated device for controlling displacement of the pump, a control valve housing, a hollow control valve member slidable in the housing, a restriction in the discharge line, a pair of conduits connected respectively to said discharge line on opposite sides of said restriction and to opposite ends of said valve housing to apply the pressure on either side of the restriction to opposite ends of the valve member to control the position of the valve member, a pressure conduit leading from said valve housing to said fluid operated device and an exhaust conduit leading from said valve housing, a port in the end of the hollow valve member adjacent the conduit leading from the downstream side of said restriction, a second port in said hollow valve member leading from the interior to communicate with said pressure conduit in one position of the valve member to supply fluid to the fluid operated device to increase pump displacement on decreased pump output flow through the restriction, and an external groove on the valve member for connecting said pressure conduit and said exhaust conduit in another position of the valve member to drain fluid from the operated device to decrease pump displacement on increased pump output flow through the restriction.

20. A hydraulic control system for a refrigeration drive comprising, in combination, a hydraulic pump having a variable speed drive, fluid operable means for increasing the pump displacement on increases in pressure therein and for decreasing pump displacement on decreases in pressure therein, a control valve responsive to the pump output for controlling the flow of a control fluid to and from the fluid operable means for varying the pump displacement in response to the pump output to provide a substantially constant output flow, a control fluid supply line leading from the control valve to the fluid operable means, and a drain line leading from said control valve, porting in said control valve for increasing the flow of control fluid through said supply line on decrease of pump output and to decrease the flow of control fluid through said supply line on increase of pump output, porting in said control valve for connecting said supply line and said drain line on increase of pump output to drain control fluid from said fluid operable means, an over pressure relief valve associated with said control valve and responsive also to pump output, porting in said over pressure relief valve for connecting said supply line and said drain line upon a predetermined maximum output pressure to drain fluid from said fluid operable means, and an independently controllable valve for venting said fluid operable means to drain fluid therefrom.

21. A hydraulic control system for a refrigeration drive comprising, in combination, a hydraulic pump having a variable speed drive, fluid actuated means for increasing the pump displacement in response to increased flow thereto and for decreasing pump displacement in response to decreased flow thereto, a control valve responsive to pump output to regulate the flow of a control fluid to and from said fluid actuated means to regulate the pump displacement in response to pump output to provide a substantially constant output flow, a supply line for conducting control fluid from said control valve to said fluid actuated means, a drain line connected between said control valve and said fluid actuated means, porting in said control valve for increasing the flow of control fluid through said supply line to said fluid actuated means on decrease of pump output and for decreasing the flow of control fluid to said fluid actuated means on increase of pump output, porting in said control valve for connecting said supply line and said drain line at said control valve on increase of pump output to drain fluid from said fluid actuated means via said supply line, said last recited porting, and said drain line, an over pressure relief valve associated with said control valve and also responsive to pump output, porting in said relief valve for connecting said supply line and said drain line at the relief valve on increase of pump output to a predetermined maximum value, an acceleration valve in the supply line having porting connecting the supply line and the fluid actuated means in a normal position of the acceleration valve, said acceleration valve being movable to a second position in response to a surge of fluid in said supply line to reduce the flow to said fluid actuated means to a value less than that which flows to the fluid actuated means in the first valve position, said acceleration valve being effective in said second position to connect said supply line and said drain line to by-pass to drain the remaining fluid flowing to the acceleration valve.

22. A hydraulic control for a refrigeration drive, comprising, in combination, a variable speed, variable displacement fluid pump, a fluid operable device for varying the displacement of the pump, means providing a source of control fluid under pressure for delivery to the fluid operable device, a control valve having a movable valve member for controlling the flow of control fluid to and from the fluid operable device to vary the pump displacement, an outlet from the pump having a restrictive orifice therein, conduits connected to the pump outlet on opposite sides of the orifice and connected respectively to opposite ends of the valve to apply the pressure on opposite sides of the orifice to opposite sides of the valve member for effecting movement of the latter in response to variations in flow through the orifice, and porting in the valve controlled by the valve member for controlling flow to and from the fluid operable device to increase pump displacement in response to decreased flow through the orifice due to decreased pump speed and to decrease pump displacement in response to increased flow through the orifice due to increased pump speed, thereby to maintain a constant pump output with variations in pump speed.

References Cited in the file of this patent
UNITED STATES PATENTS

| | | |
|---|---|---|
| 2,518,316 | Henny | Aug. 8, 1950 |
| 2,524,444 | Ifield | Oct. 3, 1950 |
| 2,530,241 | Harrington | Nov. 14, 1950 |
| 2,562,367 | Robinson | July 31, 1951 |
| 2,572,390 | Righton | Oct. 23, 1951 |
| 2,605,709 | Jubb | Aug. 5, 1952 |
| 2,669,098 | Buell | Feb. 16, 1954 |
| 2,722,889 | Wahlmark | Nov. 8, 1955 |
| 2,731,569 | Cardillo et al. | Jan. 17, 1956 |